Patented Nov. 20, 1934

1,980,988

UNITED STATES PATENT OFFICE 1,980,988

SOLVENTS FOR ETHERIFICATION OF CELLULOSE

Deane C. Ellsworth, Wilmington, Del., assignor to E. I. du Pont de Nemours & Company, Wilmington, Del., a corporation of Delaware No Drawing. Application May 3, 1933, Serial No. 669,203

11 Claims. (Cl. 260—152)

This invention relates to a process of preparing cellulose ethers and particularly to the preparation of cellulose ethers by the action of an alkyl or aralkyl halide upon the cellulose-water-caustic complex known as alkali cellulose.

Hitherto cellulose ethers have been prepared by the action of an alkyl or aralkyl halide upon alkali cellulose at relatively high temperatures for longer or shorter periods of time; the conditions being set by different investigators as to proportions of ingredients, temperatures and time such that a product containing at least a minimum amount of substituent, for example 1½ benzyl groups, per C₆-cellulose unit in the case of benzyl cellulose, would result. Usually a high degree of substitution has been sought in order to obtain solubility in the readily available commercial solvents such as benzene and toluene or combinations of these with other organic liquids. It has been consistently observed in following out these recorded processes of preparation in the case of benzyl cellulose that the product, when a useful degree of substitution has been obtained, has been uniformly so degraded as to make films of inferior strength and especially of marked brittleness. This defect can only be attributed to the deleterious effect of the rigorous conditions imposed on the cellulose during the etherification.

The use of diluents has been repeatedly disclosed in the cellulose ether literature, for example in British Patent 164,375. The diluents mentioned are of the types such as benzol and toluol and similar materials which facilitate the interpenetration of the cellulose and the etherifying agent from a mechanical point of view.

This invention has as an object, an improved process of preparing cellulose ethers. A further object is the preparation of such ethers by the use of a less rigorous and drastic etherification reaction. A further object is the preparation of these ethers by a process whereby a higher degree of substitution is obtained with an economy of etherifying agents. A still further object is the preparation of such ethers having greatly improved properties. Other objects will appear hereinafter.

These objects are accomplished by the following invention wherein alkali cellulose is reacted with a halide etherifying agent in the presence of substantial quantities of a polyether or a cyclic ether which is soluble in water.

In the process of this invention alkali cellulose previously prepared or prepared in situ by mixing cellulose, alkali, and water, is reacted with a halide etherifying agent under etherifying conditions in the presence of a water soluble ether of the class above described. The following examples are illustrative of the invention.

Example 1

In a 36% solution of sodium hydroxide, 648 grs. of dry cotton cellulose was steeped for an hour at room temperature. The swollen cellulose was then pressed to a weight of 3046 grs. and after the addition of 6 liters of p-dioxane was ground in a shredder for two hours. To the resulting slurry there was added 3048 grs. of benzyl chloride and the kneading machine was sealed tight. The contents were then mixed, the temperature being raised to 100° C. and held at this temperature for 18 hours. The mixer was then cooled and opened. The reaction product was a gum of tacky character and milky color which was stirred with an additional 4 liters of dioxane to make a dispersion which was then filtered for the removal of salt, insoluble fibers, etc. The dispersion was then worked up in any of the known ways but was preferably coagulated by stirring in a methanol-water mixture of about 80% methanol followed by mechanical separation of the flaky coagulum. This was then washed in a continuous extractor with alcohol and then with water. The product so prepared and purified was, when dry, a snow-white flaky powder and was obtained in a yield of 85-95% based on the theoretical.

Analyses by the carbon combustion method showed between 44 and 48% combined benzyl or about 1.7 benzyl groups per C₆ nucleus. The product is soluble in benzyl ether, benzyl alcohol, benzaldehyde, nitrobenzene, pyridine, chloroform, tetrachloroethane, chlorobenzene, dioxane, and in mixed solvents such as toluene-alcohol, benzene-acetic acid, etc. It is not soluble in benzene or toluene alone. The viscosity in a 10% solution in 80—20 toluene-alcohol solution is about 1 poise at 25° C. The product gives films and filaments of excellent clarity and brilliance, good strength and marked resistance to shattering and bending.

Example 2

One hundred and sixty two grs. cellulose was mixed with 243 grs. of water, 200 grs. of sodium hydroxide, 443 grs. of benzyl chloride and 1 liter of dioxane and the reaction mixture was heated for 8 hours at 90-95° C. There were then added an additional 200 grs. of sodium hydroxide and an additional 443 grs. of benzyl chloride and the reaction was continued for 12 hours at 90-95° C.

There was obtained 243 grs. of a product containing 52.6% combined benzyl. Of this product 92% was soluble in the reaction mixture after the addition of further dioxane. The product had a viscosity of 40 centipoises in pyridine solution. A similar experiment in which benzene was substituted for dioxane gave a product having only 45.2% combined benzyl, this product being 82.4% soluble in the reaction mixture after the addition of further benzene.

Example 3

One hundred and sixty two grs. of cellulose, 360 grs. of water, 240 grs. of sodium hydroxide and 633 grs. of benzyl chloride were reacted in the presence of 1800 cc. of dioxane for 18 hours at 95°±5° C. There was obtained 216 grs. of a product containing 44.1% combined benzyl, this product being 64% soluble in the reaction mixture on the addition of further dioxane.

A similar experiment in which the dioxane was replaced by toluene resulted in a product containing only 36.3% combined benzyl, this product being only 2.1% soluble in the reaction mixture after the addition of further toluene.

Example 4

Six hundred and forty eight grs. of cellulose, 1440 grs. of water, 960 grs. of sodium hydroxide and 2532 grs. of benzyl chloride were reacted in the presence of 6000 cc. of dioxane for 18 hours at 100°±5° C. The cellulose used in this case was air dried bulk linters of the viscosity of 609 seconds. The cellulose used in the previous examples was oven-dry cotton linter sheets of about 16 second viscosity. Ten hundred thirty seven grs. of product was obtained containing 47.4% combined benzyl, the product being 60.5% soluble in the reaction mixture upon the addition of further dioxane and having a viscosity of 1000 centipoises in 10% solution in toluene-alcohol solution.

Comparative experiments using pyridine, acetone, toluene, and dioxane indicated the superiority of dioxane in percentage of combined benzyl as well as in percentage of reaction product soluble in the reaction mixture.

The above examples show the benzylation of cellulose in the presence of dioxane. It has also been found that the addition of dioxane to a reaction mixture leading to ethyl cellulose is of marked benefit. The following two examples demonstrate the preparation of ethyl cellulose using dioxane.

Example 5

A mixture of 86 grs. air dried cotton cellulose, 85 grs. water, and 200 grs. flake caustic was ground together in the presence of 1400 cc. of p-dioxane to a uniform slurry. This was heated with 390 grs. of ethyl chloride in an autoclave at 130° C. for 18 hours. At the end of this time the ether is in solution and may be recovered in any of the ways known to the prior art as by precipitation with water, still distillation, washing, etc., to give a white finely granular product. This analyses by the Zeisel method about 28–29% ethyl or 2.2 ethyl groups per $C_6$ nucleus. The ether is soluble in all the well known cellulose ether solvents and gives films of excellent strength and pliability. The product is definitely whiter and gives solutions of increased clarity and sparkle as well as of practically double the viscosity of ethyl cellulose prepared using benzene or toluene as the diluent.

Example 6

In a grinding or shredding machine 86 grs. of air dried cotton cellulose, 85 grs. of water, 200 grs. of caustic and 1400 cc. of dioxane are shredded together to a uniform slurry. This is heated with 545 grs. of ethyl bromide at 130° in an autoclave for 18 hours, the contents being well agitated. At the end of this time the ethyl cellulose is found to be a smooth dispersion which may be filtered and coagulated by the known methods. The pure and dry ether is white, granular, easily soluble in a wide variety of solvents, analyses about 2.2–2.3 ethyl groups per $C_6$ nucleus and gives films from alcohol-toluene solution of excellent softness, strength and pliability.

While the above examples illustrate the use of a range of 1.65 to 3.75 parts of dioxane per part of alkali cellulose, other ratios of alkali cellulose to ether diluent may be used. Ordinarily at least one and one half parts by weight of diluent per part of alkali cellulose is used. From one and one half to five parts by weight of diluent per part of alkali cellulose is preferred although higher ratios may be used.

The invention is not limited to the preparation of benzyl and ethyl cellulose. Other ethers may also be made, for example by the use of propyl chloride; methyl bromide; allyl bromide; normal butyl bromide; 1-chlorobutene-2; 1,2-dichlorobutene-2; cinnamic chloride or other alkyl or aralkyl halide etherifying agents for cellulose.

While the invention has been explained in terms of cellulose and its alkali compounds any cellulosic material or conversion product, pretreated cellulose, oxycellulose or hydrocellulose, all of which are commonly comprehended under the term "cellulose", may be used.

The examples have disclosed the use of p-dioxane. For this ether there may be substituted any other low molecular-weight polyether or cyclic ether having a substantial solubility in water under the conditions of the reaction. These combine the properties of inertness with wetting of alkali cellulose, water solubility, organic solvent solubility, and solvent action for cellulose ethers and by-products of the reaction, which combination of properties is believed to explain the inherent improvement of the process. While complete miscibility of the inert ether medium with water produces best results, substantial improvement is obtained with ethers having only a partial solubility in water and begins to be definitely marked when the ether is soluble to the extent of at least 15% by weight.

Polyethers are preferred because of their greater chemical similarity to the products produced. Ethers which are suitable for the purposes of the reaction are the dimethyl ether of ethylene glycol, tetrahydrofurane, tetrahydromethylfurane, trimethyl ether of glycerol, tetramethyl ether of pentaerythritol, trimethylin, triethylin, dimethyl ether of diethylene glycol, dimethyldioxane, methyldioxane, tetrahydromethoxyfurane, thioxane, ethoxydioxane, and diglyceroltriether. Ethylene oxide, being reactive toward alkali cellulose, is not suitable as a diluent inasmuch as the diluent must be inert that is, must take no part in the reaction other than as an adjuvant. The ether to be inert must obviously be free from reactive groups such as hydroxyl, carbonyl, carboxyl or other group which would cause reaction with the alkali cellulose or the halide etherifying agent under the conditions of the reaction.

The water soluble inert ether diluents of this invention combine at least three functions because of their peculiar properties. They are solvents for the etherifying agent for example, benzyl chloride and at the same time are capable of "wetting" the alkali cellulose upon which the benzyl chloride must act. This allows much more intimate contact and interpenetration of the benzyl chloride and alkali cellulose than would obtain if benzyl chloride were used alone or if benzyl chloride were used dissolved in a diluent such as benzene or toluene. This wetting of alkali cellulose is a process undoubtedly tied up with the peculiar fact that these ethers are substantially soluble in water as well as in organic liquids.

The second function that these ethers fulfill is the solution of the ether produced. These ethers are excellent solvents for most cellulose ethers and particularly so when mixed with the by-products of the reaction.

The third function is the solution of the by-products of the reaction, only the sodium chloride or other alkali halide being insoluble. This makes for a homogeneous reaction product readily filterable from which the ether may be coagulated in water, methanol, or other media.

The cellulose ethers obtained by the process of this invention may be used for all the purposes for which cellulose ethers are employed, for example in lacquers, plastics, impregnating compositions, adhesives and the like. For certain purposes, for example in coating compositions and in the manufacture of plastics for safety glass, the cellulose ethers prepared by this process are particularly useful.

As many apparent and widely different embodiments of this invention may be made without departing from the spirit thereof, it is to be understood that I do not limit myself to the foregoing examples or description except as indicated in the following claims.

I claim:

1. Process for the preparation of cellulose ethers comprising etherifying alkali cellulose with a halide etherifying agent in the presence of a low molecular weight, inert, water soluble ether of the class consisting of polyethers and cyclic ethers.

2. Process for the preparation of cellulose ethers comprising etherifying alkali cellulose with a halide etherifying agent in the presence of a low molecular weight, inert, water soluble polyether.

3. Process for the preparation of cellulose ethers comprising etherifying alkali cellulose with an aralkyl halide in the presence of a low molecular weight, inert, water soluble polyether.

4. Process for the preparation of benzyl cellulose ethers comprising etherifying alkali cellulose with a benzyl halide in the presence of a low molecular weight, inert, water soluble polyether.

5. Process for the preparation of benzyl cellulose comprising etherifying alkali cellulose with a benzyl halide in the presence of p-dioxane.

6. Process for the preparation of cellulose ethers comprising etherifying alkali cellulose with a halide etherifying agent in the presence of a low molecular weight, inert, water soluble cyclic ether.

7. Process for the preparation of cellulose ethers comprising etherifying alkali cellulose with an aralkyl halide in the presence of an inert, water soluble cyclic ether.

8. Process for the preparation of benzyl cellulose comprising etherifying alkali cellulose with a benzyl halide in the presence of an inert, water soluble cyclic ether.

9. Process for the preparation of cellulose alkyl ethers comprising etherifying alkali cellulose with an alkyl halide in the presence of an inert, water soluble cyclic ether.

10. Process for the preparation of ethyl cellulose comprising etherifying alkali cellulose with an ethyl halide in the presence of an inert, water soluble cyclic ether.

11. Process for the preparation of ethyl cellulose comprising etherifying alkali cellulose with an ethyl halide in the presence of dioxane.

DEANE C. ELLSWORTH